US009709676B2

(12) United States Patent
Eno et al.

(10) Patent No.: US 9,709,676 B2
(45) Date of Patent: Jul. 18, 2017

(54) LASER LIGHT EMITTING DEVICE HAVING A MODE SCRAMBLER FOR UNIFYING LIGHT INTENSITY DISTRIBUTION

(71) Applicant: Kabushiki Kaisha TOPCON, Tokyo-to (JP)

(72) Inventors: Taizo Eno, Tokyo-to (JP); Shigenori Nagano, Tokyo-to (JP); Ken-ichiro Yoshino, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 73 days.

(21) Appl. No.: 14/813,399

(22) Filed: Jul. 30, 2015

(65) Prior Publication Data

US 2016/0036193 A1     Feb. 4, 2016

(30) Foreign Application Priority Data

Jul. 31, 2014  (JP) ................. 2014-156125

(51) Int. Cl.
*H01S 3/067* (2006.01)
*G01S 17/08* (2006.01)
*H01S 3/0941* (2006.01)
*H01S 3/094* (2006.01)
*H01S 3/115* (2006.01)
*H01S 3/117* (2006.01)
*H01S 3/16* (2006.01)

(52) U.S. Cl.
CPC .......... *G01S 17/08* (2013.01); *H01S 3/06704* (2013.01); *H01S 3/0941* (2013.01); *H01S 3/094053* (2013.01); *H01S 3/115* (2013.01); *H01S 3/117* (2013.01); *H01S 3/1611* (2013.01); *H01S 3/1673* (2013.01)

(58) Field of Classification Search
CPC ......... H01S 3/094084; H01S 3/094053; H01S 3/067
USPC ...... 250/227.19–227.21, 227.11; 372/33–39, 372/66–98
See application file for complete search history.

(56) References Cited

U.S. PATENT DOCUMENTS

| 6,690,695 B2 * | 2/2004 | Peressini ............... H01S 3/0941 372/34 |
| 7,664,148 B2 | 2/2010 | Sakai et al. |
| 2008/0013586 A1 | 1/2008 | Spence et al. |

FOREIGN PATENT DOCUMENTS

| JP | 09-318743 A | 12/1997 |
| JP | 2009198680 A | 9/2009 |

(Continued)

OTHER PUBLICATIONS

European communication dated Dec. 11, 2015 in corresponding European patent application No. 15179270.2.
"Multimode Fiber Mandrels", Fluke Networks, Inc., Feb. 2003.

Primary Examiner — Que T Le
(74) Attorney, Agent, or Firm — Nields, Lemack & Frame, LLC (57) ABSTRACT

The invention provides a laser light emitting device, which comprises a laser light emitter for emitting a pump light, a resonator for emitting a laser beam by oscillating and amplifying the pump light and a multi-mode fiber for guiding the pump light emitted from the laser light emitter to the resonator, wherein a mode scrambler is provided on the multi-mode fiber, the pump light propagating the multi-mode fiber is stirred and a light intensity distribution is unified by the mode scrambler, and the pump light is entered to the resonator.

3 Claims, 5 Drawing Sheets

(56) References Cited

FOREIGN PATENT DOCUMENTS

| JP | 2010-62224 A | 3/2010 |
| JP | 4530348 B2 | 8/2010 |
| WO | 97/07576 A1 | 2/1997 |
| WO | 2009104350 A1 | 8/2009 |

\* cited by examiner

LASER LIGHT EMITTING DEVICE HAVING A MODE SCRAMBLER FOR UNIFYING LIGHT INTENSITY DISTRIBUTION

BACKGROUND OF THE INVENTION

The present invention relates to a laser light emitting device using a multi-mode fiber and a laser surveying instrument comprising the laser light emitting device.

A pump light, emitted by a laser diode is entered into a cavity via a multi-mode fiber, and at the cavity, pumping is performed on the pump light. The pump light is resonated, amplified and outputted as a laser beam.

The multi-mode fiber to guide the pump light to the cavity is subject to a deformation as required such as bending, twisting, etc. in the process of installing on a device or an instrument. Stress is generated inside the multi-mode fiber due to deformation and the generated stress exerts influence on an advancing condition of a laser beam which propagates the multi-mode fiber, causes non-uniformity of light intensity distribution and deteriorates a quality of the laser beam.

For instance, in a case were a laser light emitting device is used in a laser surveying instrument, non-uniformity of the light intensity distribution exerts influence on an accuracy of distance measurement because non-uniformity of the light intensity distribution gives influence on a photodetection intensity of a reflection light.

For this reason, it is necessary to uniform the light intensity distribution of the pump light entering the cavity.

Conventionally, the laser diode is selected or a light emitting condition of the laser diode is adjusted or the like so that light intensity distribution of the pump light emitted from the multi-mode fiber would be uniform under a condition where the multi-mode fiber is fitted on the laser diode.

For this reason, an yield of the laser light emitting device is low, much cost for adjustment is needed, etc. and the laser light emitting device is of high cost.

SUMMARY OF THE INVENTION

It is an object of the present invention to provide a laser light emitting device, which can easily uniform a light intensity distribution of a pump light, and to provide a laser surveying instrument comprising the laser light emitting device in a laser light emitting device having multi-mode fiber.

To attain the object as described above, a laser light emitting device according to the present invention comprises a laser light emitter for emitting a pump light, a resonator for emitting a laser beam by oscillating and amplifying the pump light and a multi-mode fiber for guiding the pump light emitted from the laser light emitter to the resonator, wherein a mode scrambler is provided on the multi-mode fiber, the pump light propagating the multi-mode fiber is stirred and a light intensity distribution is unified by the mode scrambler, and the pump light is entered to the resonator.

Further, in the laser light emitting device according to the present invention, the mode scrambler is provided at an emitting end of the multi-mode fiber.

Furthermore, in a laser surveying instrument according to the present invention, a laser surveying instrument which projects a laser beam to an object to be measured and performs distance measurement by receiving a reflection light from the object to be measured, comprises the laser light, emitting device as a light emitting source of the laser beam.

According to the present invention, the laser light emitting device comprises a laser light emitter for emitting a pump light, a resonator for emitting a laser beam by oscillating and amplifying the pump light and a multi-mode fiber for guiding the pump light emitted from the laser light emitter to the resonator, wherein a mode scrambler is provided on the multi-mode fiber, the pump light propagating the multi-mode fiber is stirred and a light intensity distribution is unified by the mode scrambler, and the pump light, is entered to the resonator. As a result, even in a case where light intensity distribution of the pump light emitted from a multi-mode fiber is non-uniform, there is no need to select a laser diode or to adjust a light emitting condition of the laser diode, and it is possible to improve an yield of the laser light emitting device and to provide a laser light emitting device at a lower cost.

Further, according to the present invention, a laser surveying instrument which projects a laser beam to an object to be measured and performs distance measurement by receiving a reflection light from the object to be measured, comprises the laser light emitting device as a light emitting source of the laser beam. As a result, it is possible to reduce the manufacturing cost of the laser surveying instrument.

DETAILED DESCRIPTION OF THE PREFERRED EMBODIMENT

Description will be given below on embodiments of the present invention by referring to the attached drawings.

Figure 1:
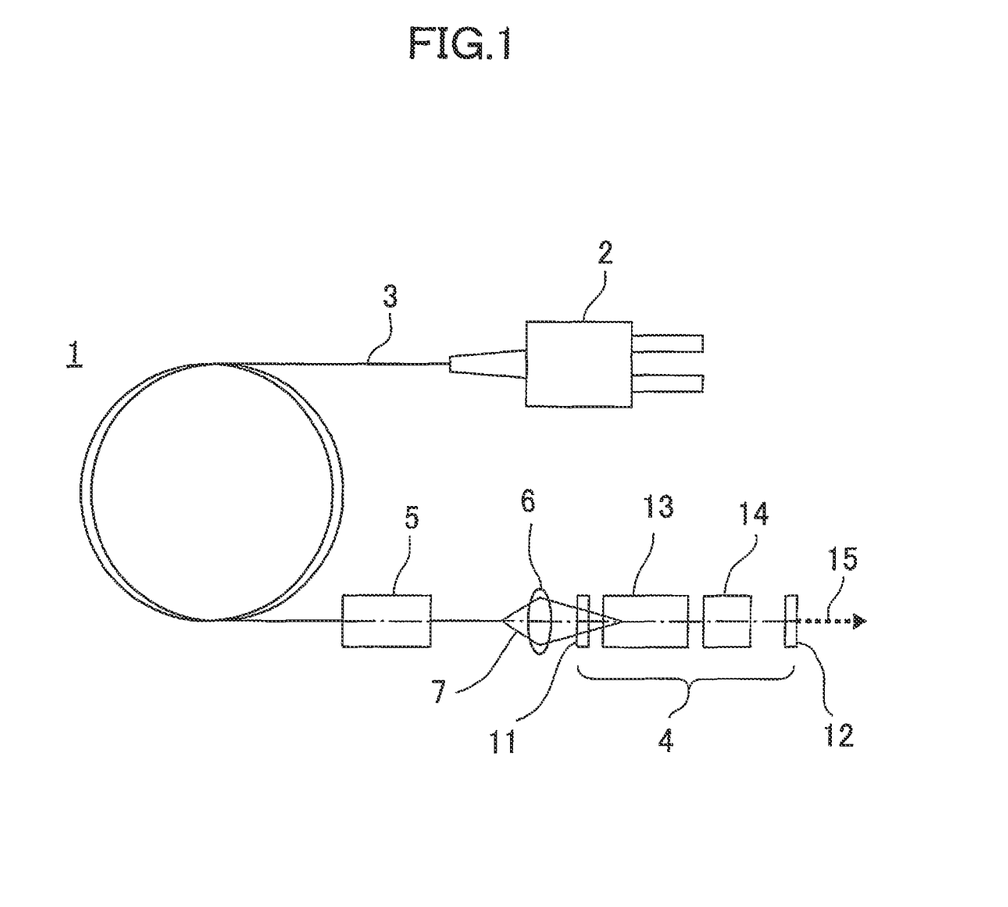
FIG. 1 is a schematical block diagram of a laser light emitting device according to an embodiment of the present invention.

FIG. 1 shows a laser light emitting device 1 according to an embodiment of the present invention.

In FIG. 1, reference numeral 2 denotes a laser light emitter (LD light emitter) which emits a pump light, reference numeral 3 denotes an optical fiber (multi-mode fiber) which guides the pump light emitted from the LD light emitter 2 to a position as required. (e.g. an optical cavity 4). The optical fiber 3 is curved in a form of a coil or is treated as required such as bending, twisting, etc. to change a direction.

Further, a mode scrambler 5 is provided at a position as required of the optical fiber 3, preferably near an emitting end. At a position opposite to the emitting end of the optical fiber 3, a focus lens 6 is provided. The focus lens 6 focuses a pump light 7 emitted from the optical fiber 3 and makes the pump light 7 to enter the optical cavity 4.

The pump light entering the optical cavity 4 is oscillated to a fundamental wave at the optical cavity 4, amplified, emitted from the optical cavity 4 or the pump light is oscillated. as a second harmonic generation, amplified, and emitted as a laser beam as demanded.

A description will be given on the optical cavity 4.

A first cavity mirror 11 is disposed on an incident side of the optical cavity 4 and a second cavity mirror 12 disposed on an emitting side of the optical cavity 4. Between the first cavity mirror 11 and the second cavity mirror 12, a laser medium 13 and a Q switch device 14 are provided from the first cavity mirror 11 side.

The laser medium 13 is selected corresponding to a wavelength of a pulsed laser beam 15, which is outputted as a Q switch pulse from the optical cavity 4.

For instance, if Nd:YVO4 is used as the laser medium 13, an oscillation wavelength is 1064 nm. If Nd: YAG is used as the laser medium 13, Nd:YAG has the oscillation wavelength of 946 nm, 1064 nm, 1319 nm, etc. Further, Er, Yb:Glass or the like having the oscillation. wavelength in the zone of 1.54 μm may be used In a case where the fundamental wave is amplified between the first cavity mirror 11 and the second cavity mirror 12 and reaches a predetermined energy or higher, the Q switch device 14 has a function of emitting fundamental waves from the optical cavity 4. Therefore, a pulsed laser beam 15 is emitted as a pulsed light from the optical cavity 4.

It is to be noted that as the Q switch device 14, an electrooptical element, an acoustooptical element, a saturable absorber or an electronic shutter, etc. are used Further, it is possible to generate a pulsed laser beam of a second harmonic generation by providing a nonlinear crystal and by oscillating a second harmonic generation, on the optical cavity 4.

Next, a description will be given on the mode scrambler 5.

As described above, by using the optical fiber 3, a light intensity distribution of the pump light may become nonuniform. The light intensity distribution of the pump light entering the optical cavity 4 exerts influence on light intensity, pulse width, repetition frequency and polarization of the pulsed laser beam 15. The mode scrambler 5 is used to uniform a light intensity of the pump light, which enters the optical fiber 3.

The mode scrambler 5 gives a mechanical deformation on the optical fiber 3 and makes a stress to be generated in the optical fiber 3. The stress generated in the optical fiber 3 exerts influence on an advancing condition of a laser beam propagated in the optical fiber 3, and by generating stress in the optical fiber 3, the laser beam propagated in the optical fiber 3 is stirred and promotes uniformity of the light intensity distribution.

Figure 2:
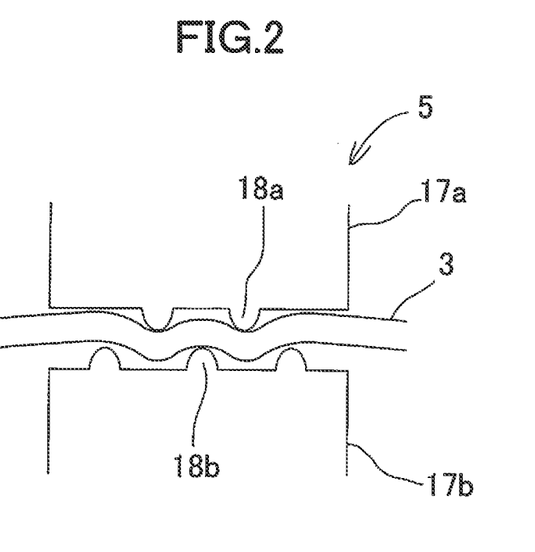
FIG. 2 is an explanatory drawing to show one example of a mode scrambler used. in the laser light emitting device.

FIG. 2 shows one aspect of giving a deformation to the optical fiber 3 in the mode scrambler 5.

Pressing members 17a. and 17b at positions opposing to each other are provided, sandwiching the optical fiber 3. The pressing members 17a and 17b have convex portions 18a and 18b respectively on surfaces opposing each other and the convex portions 18a and 18b are arranged in a staggered arrangement with respect to the optical fiber 3.

By pressing the pressing members 17a and 17b on the optical fiber 3, the optical fiber 3 is alternately bent in different directions by the convex portions 18a. and 18b. Therefore, inside the mode scrambler 5, the optical fiber 3 is deformed so as to meander. Therefore, inside the optical fiber 3, the condition of stress generation is changed along an axial direction of the optical fiber 3.

It is to be noted that as a method to bend the optical fiber 3 so as to meander, various methods may be conceived. It may be so arranged that pins having a predetermined diameter may be erected along a linear line at a predetermined interval and the optical fiber 3 may be inserted by bending between the pins.

Figure 3:
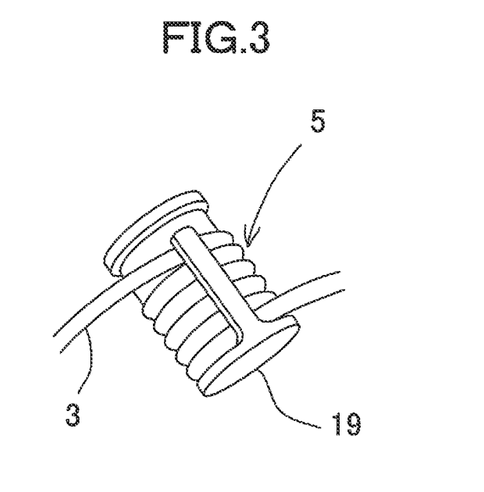
FIG. 3 is an explanatory drawing to show another example of a mode scrambler used in the laser light emitting device.

FIG. 3 shows another modified example of the optical fiber 3 in the mode scrambler 5.

In another modified example, the optical fiber 3 is wound up several times around a cylindrical core 19. In the modified example, too, by winding up the optical fiber 3, a bending and a deformation are given to the optical fiber 3, and a stress is generated inside the optical fiber 3.

It is to be noted that the deformation as given above may be synthesized or a torsion deformation may be further added.

Figure 4A:
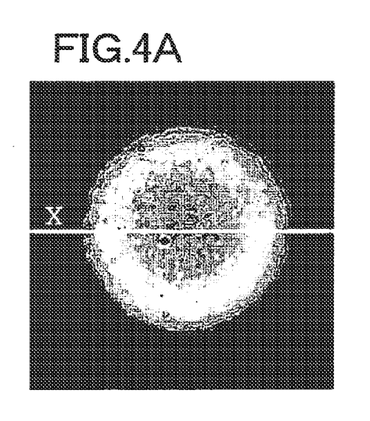
FIG. 4A and FIG. 4B each represents a drawing to show an image of a light intensity of a cross-section of a luminous flux of a pump light, in a case where the mode scrambler is not provided and in a case where the mode scrambler is provided, respectively.
Figure 4B:
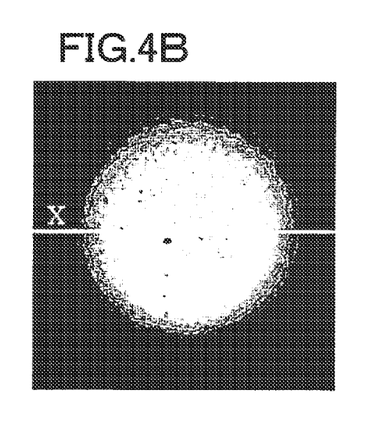

Referring to FIG. 4A and FIG. 4B, a description will be given on an effect in a case where the mode scrambler 5 is provided on the optical fiber 3. FIG. 4A shows a light intensity image of a cross-section of a luminous flux of a pump light in a case where the mode scrambler 5 is not provided, and FIG. 4B shows a light intensity image of a cross-section of a luminous flux of a pump light in a case where the mode scrambler 5 is provided. In FIG. 4A and FIG. 4B, a brighter portion shows a portion where light intensity is stronger and a darker portion shows a portion where light intensity is weaker.

In FIG. 4A, a central portion is darker and it is evident that the light intensity is weaker. Further, in FIG. 4B, the entire portion is brighter and it is evident that the light intensity is uniform.

Figure 5A:
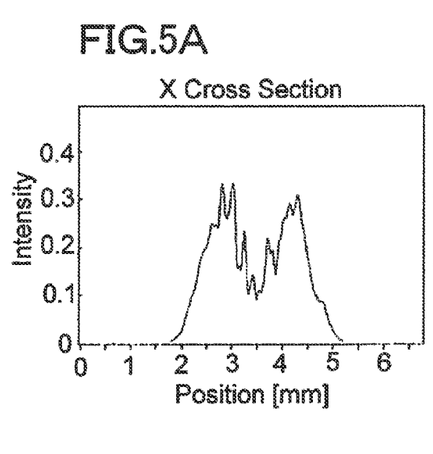
FIG. 5A and FIG. 5B each represents a graph to show a light intensity distribution along an X-line in FIG. 4A and FIG. 4B respectively.
Figure 5B:
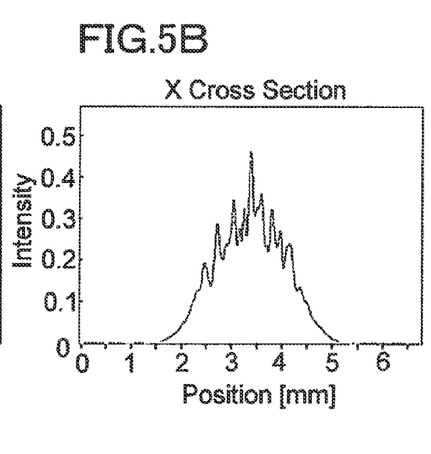

Further, FIG. 5A and FIG. 5B show graphic representation of the light intensity distribution along X-line in FIG. 4A and FIG. 4B respectively. FIG. 5A shows a case where the mode scrambler 5 is not provided and FIG. 5B shows a case where the mode scrambler 5 is provided.

In FIG. 5A, a big drop can be seen at the central portion of a luminous flux. However, in FIG. 5B, the light intensity becomes the highest at the central portion of the luminous flux and the light intensity is gradually decreased toward a periphery, which is a favorable light intensity distribution.

Figure 6A:
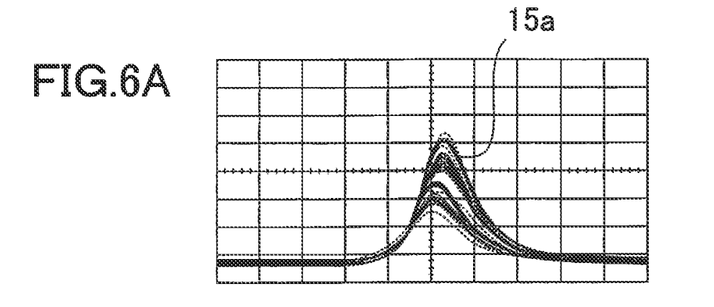
FIG. 6A is a graph to show an oscillating condition of light pulses in a case where a mode scrambler is not provided.
Figure 6B:
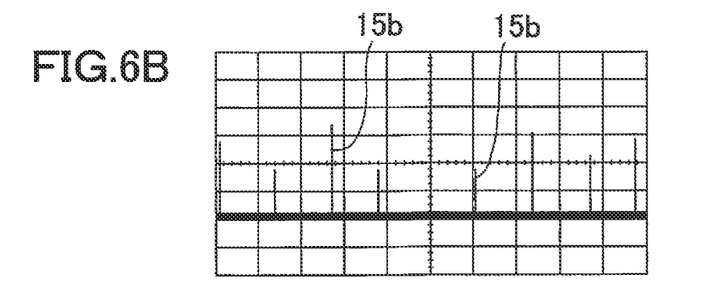
FIG. 6B is a graph to show pulse intensity and is a graph to show a light emission of pulses in time series.

FIG. 6A and FIG. 6B each shows an oscillating condition of light pulses in a case where the mode scrambler 5 is not provided. Further, FIG. 6A shows a pulse intensity waveform 15a, which is an overwritten image, and FIG. 6B shows a pulse intensity 15b and shows a light emission of pulses in time series.

In a case where the mode scrambler 5 is not provided, there are diversities in peak values of a light emission intensity and as shown in FIG. 6B, pulse intensities are alternately decreased by one half. The varying of light emission intensity is caused by the varying of a polarization. direction of the pump light as emitted from the optical fiber 3.

Figure 7A:
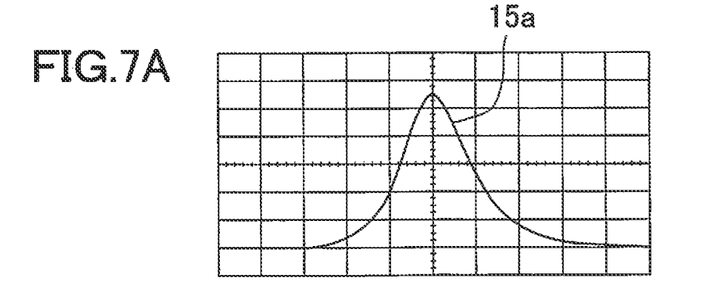
FIG. 7A is a graph to show an oscillating condition of light pulses in a case where a mode scrambler is provided.
Figure 7B:
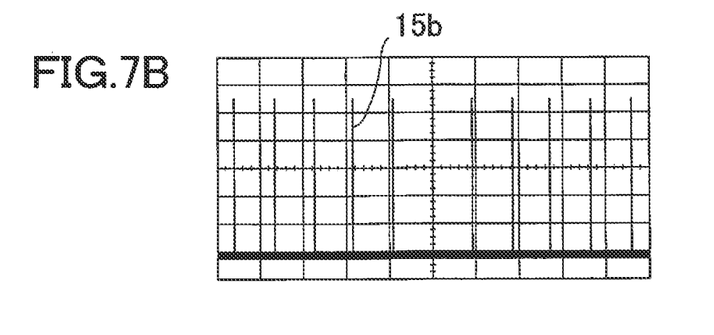
FIG. 7B is a graph to show pulse intensity and is a graph to show a light, emission of pulses in time series.

Similarly to FIG. 6A and FIG. 6B, FIG. 7A and FIG. 7B each shows an oscillating condition of light pulses in a case where the mode scrambler 5 is provided. Further, FIG. 7A shows a pulse intensity waveform 15a, which is an overwritten image, and FIG. 7B shows a pulse intensity 15b and shows a light emission of pulses in time series.

In a case where the mode scrambler 5 is provided, a peak value of light emission intensity is constant, as shown in FIG. 7A, and the light emitting condition is stabilized. Further, as shown in FIG. 7B, a pulse intensity is constant. This shows that the polarization direction of the pump light as emitted is stable.

It is to be noted that as other effects, it is confirmed that generation of sub-pulses are suppressed and a pulse jitter is decreased.

Also, by providing the mode scrambler 5 on the optical fiber 3, it is possible to unify the light intensity distribution of the pump light and no improve a quality of the laser beam in the laser light emitting device 1 having multi-mode fiber.

Figure 8:
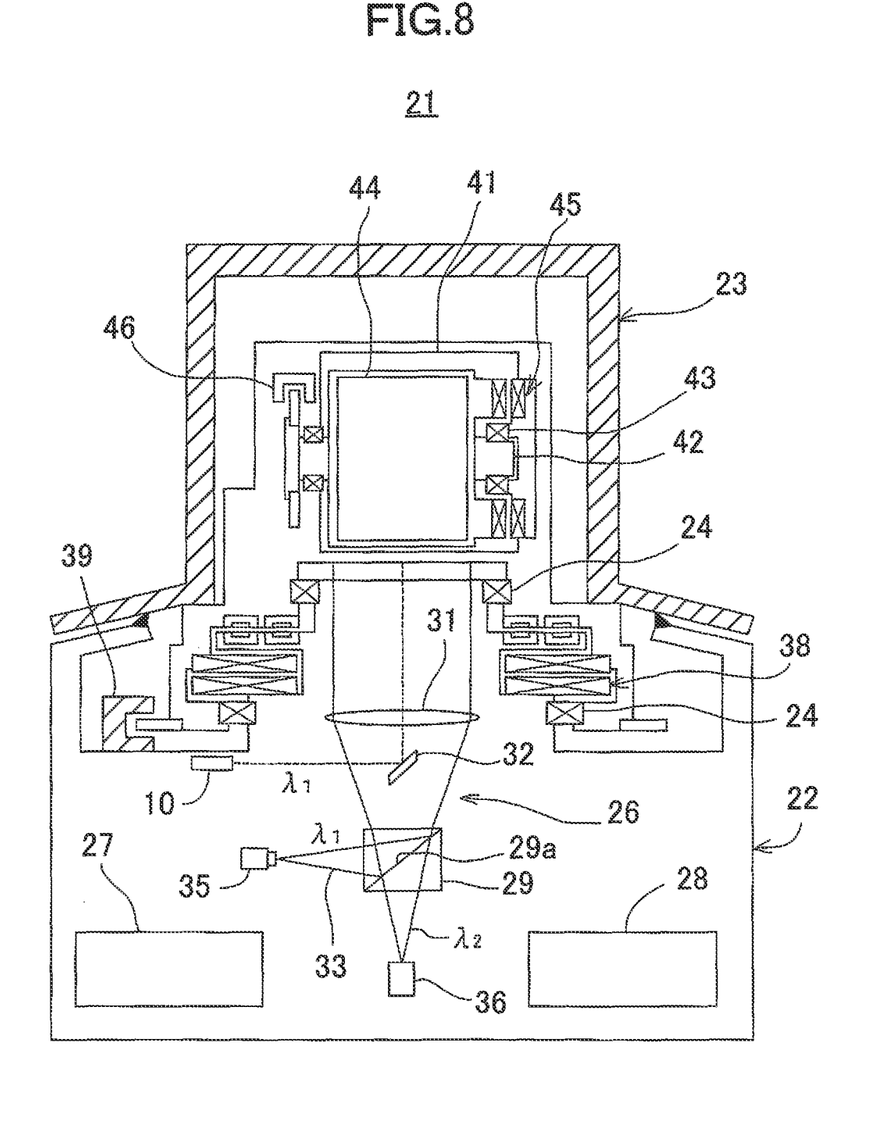
FIG. 8 is a schematical drawing of a laser surveying instrument provided with the laser light emitting device according to the present invention.

As a device provided with a laser light emitting device of the present invention, a laser surveying instrument as shown in FIG. 8 can be exemplified.

A laser surveying instrument 21 primarily comprises a main unit 22 installed via a leveling unit (not shown) and a rotating unit 23 rotatably mounted on the main unit 22.

The rotating unit 23 is mounted on the main unit 22 via a bearing 24 and rotatable around a vertical rotation shaft center as the center.

In the main unit 22, a distance measuring optical system 26, a control arithmetic unit 27, a power supply unit 28, etc. are accommodated.

The distance measuring optical system 26 has an optical axis, which coincides with the rotation axis. Along the optical axis, there are provided a beam splitter 29, a focus lens 31, and a mirror 32 used as a polarization optical member arranged between the focus lens 31 and the beam splitter 29, and a laser light emitting device 10 is provided at an opposing position of the mirror 32. The laser light emitting device 10 has an arrangement equivalent to that of the laser light emitting device 1 as shown in FIG. 1.

A pulsed laser beam 33 (wavelength λ1) as a distance measuring light is emitted from the laser light emitting device 10. The pulsed laser beam 33 is reflected by the mirror 32 and arranged so as to be deflected along the optical axis.

The beam splitter 29 has a reflection surface 29a where a wavelength selecting film is formed, and the optical axis is divided by the reflection surface 29a. A photodetection unit 35 is provided along a reflection optical axis thus divided, and an image pickup element 36 is provided on a transmission optical axis, which passes through the reflection surface 29a.

The reflection surface 29a reflects a distance measuring reflection light with wavelength λ1 towards the photodetection unit 35, and allows natural light (visible light, wavelength λ2) to pass through. The natural light passing through the reflection surface 29a is received by the image pickup element 36, and the image pickup element 36 acquires a background image including an object to be measured.

A horizontal rotation motor 3A designed in ring-like shape is provided between the main unit 22 and the bearing 24, and the rotating unit 23 is rotated by the horizontal rotation motor 38. Further, a horizontal encoder 39 as a horizontal angle detector is provided between the main unit 22 and the rotating unit 23, and a relative rotating angle of the rotating unit 23 with respect to the main unit 22 can be detected by the horizontal encoder 89.

On a rotation frame 41 supported by the bearing 24, a horizontal shaft 42 orthogonal to the rotation shaft center (i.e. the optical axis) is rotatably supported via a hearing 43.

An elevation rotary mirror 44, which is an optical axis deflecting member, is fixed on the horizontal shaft 42, and it is so arranged that the elevation rotary mirror 44 is rotated integrally with she horizontal shaft 42.

On the rotation frame 41, an elevation rotary motor 45 in a ring-like shape is provided concentrically with the horizontal shaft 42, and. the elevation rotary motor 45 rotates the elevation rotary mirror 44 around the horizontal shaft 42 as the center in an elevation direction. Further, between the rotation frame 41 and the horizontal shaft 42, an elevation encoder 46 is provided and. arranged so as to detect an elevation angle of the horizontal shaft 42, i.e. the elevation rotary mirror 44.

In the following, a description will be given on a distance measurement by the laser surveying instrument 21.

The control arithmetic unit 27 controls the light emission of the laser light emitting device 10, and controls drivings of the horizontal rotation motor 38 and the elevation rotary motor 45. Further, a horizontal rotation of the rotating unit 23 is detected by the horizontal encoder 39, and an elevation angle of the elevation rotary mirror 44 is detected by the elevation encoder 46. The control arithmetic unit 27 controls a posture of the elevation rotary mirror 44 to a condition as desired based. on detection results of the horizontal encoder 39 and the elevation encoder 46.

A pulsed distance measuring light is emitted from the laser light emitting device 10. The pulsed distance measuring light is reflected by the mirror 32, is turned to parallel luminous fluxes by the focus lens 31, is deflected in a horizontal direction by the elevation rotary mirror 44 and is projected to an object to be measured.

A reflected distance measuring light from the object to be measured is deflected along the optical axis by the elevation rotary mirror 44, is deflected towards the photodetection unit 35 by the reflection surface 29a, and is focused on the photodetection unit 35 by the focus lens 31.

Further, background light from the object to be measured passes through the beam splitter 29 (the reflection surface 29a) via the elevation rotary mirror 44 and the focus lens 31, is received by the image pickup element 36 and a background image including the object to be measured is acquired by the image pickup element 36.

Based on a photodetection signal of the reflected distance measuring light from the photodetection unit 35, the control arithmetic unit 27 calculates a distance to the object to be measured, the detection results of the horizontal encoder 39 and the elevation encoder 46 at the moment when the reflected distance measuring light is received are obtained, a horizontal angle and an elevation angle of the object to be measured are calculated and measurement of the object to be measured is performed. Further, by obtaining the image at the moment of the measurement, a three-dimensional measurement with the image of the object to be measured can be performed.

The invention claimed is:

1. A laser light emitting device, comprising a laser light emitter for emitting a pump light, an optical cavity for emitting a laser beam by oscillating and amplifying the pump light and a multi-mode fiber for guiding the pump light emitted from said laser light emitter to said optical cavity, wherein a mode scrambler is provided on said multi-mode fiber, the pump light propagating said multi-mode fiber is stirred and a light intensity distribution is unified by said mode scrambler, and the pump light is entered to said optical cavity.

2. A laser light emitting device according to claim 1, wherein said mode scrambler is provided at an emitting end of said multi-mode fiber.

3. A laser surveying instrument which projects a laser beam to an object to be measured and performs distance measurement by receiving a reflection light from said object to be measured, comprising said laser light emitting device according to claim 1 as a light emitting source of said laser beam.

* * * * *